No. 638,874. Patented Dec. 12, 1899.
R. MACRAE.
SUPPORTING DEVICE FOR BATTERY ELECTRODES AND CUPS.
(Application filed Apr. 8, 1899.)
(No Model.)
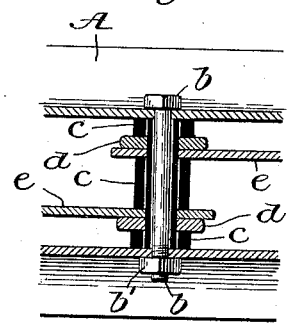
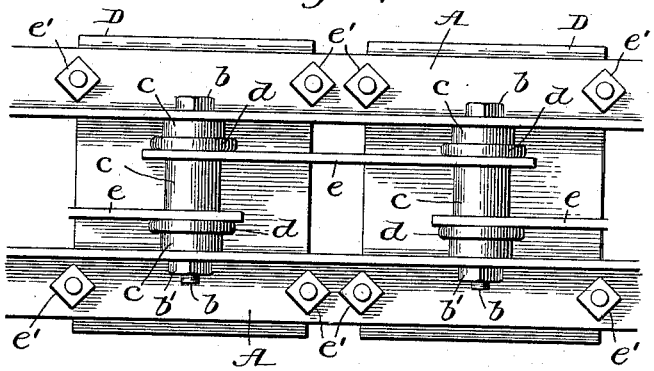
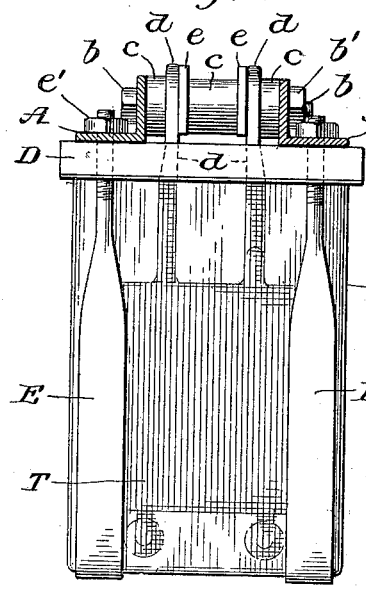
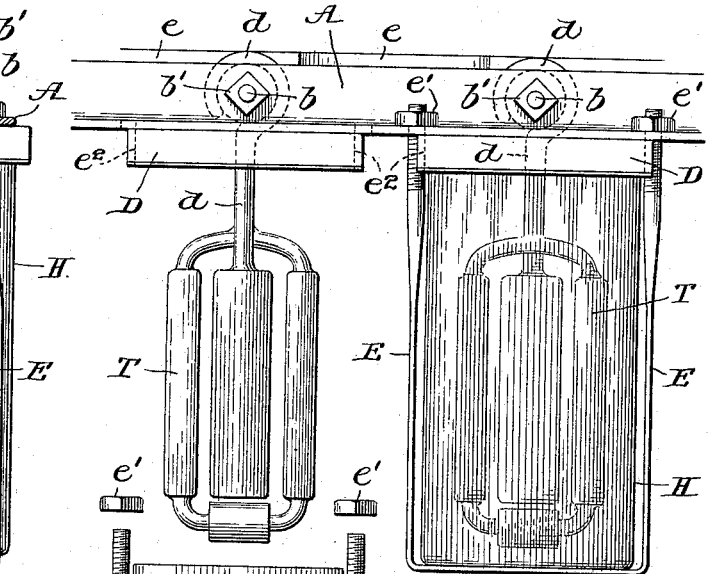
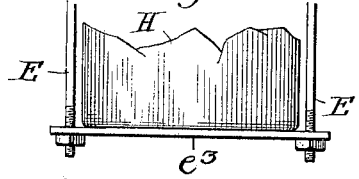
WITNESSES:
A. V. Groupe
C. E. Parker
INVENTOR
Roderick Macrae
BY
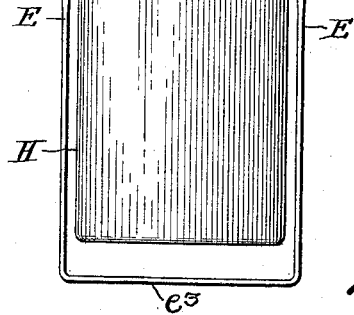
ATTORNEY

UNITED STATES PATENT OFFICE.

RODERICK MACRAE, OF BALTIMORE, MARYLAND, ASSIGNOR OF ONE-HALF TO WILLIAM C. L. EGLIN, OF PHILADELPHIA, PENNSYLVANIA.

SUPPORTING DEVICE FOR BATTERY ELECTRODES AND CUPS.

SPECIFICATION forming part of Letters Patent No. 638,874, dated December 12, 1899.

Application filed April 8, 1899. Serial No. 712,271. (No model.)

*To all whom it may concern:*

Be it known that I, RODERICK MACRAE, a subject of the Queen of Great Britain and Ireland, residing in the city of Baltimore, in the State of Maryland, have invented certain new and useful Improvements in Supporting Devices for Battery Electrodes and Cups, of which the following is a full, clear, and exact description, reference being had to the accompanying drawings, forming a part of this specification.

My invention relates to devices for supporting storage-battery elements in the electrolyte, and has for its object to enable the cups or electrolyte-receptacles to be placed in position relatively to the electrodes and removed therefrom when desired without disturbing, removing, or handling the electrodes or detaching them from their supporting means, and other advantages incident to that method of assembling the elements. For these purposes my invention consists of the devices hereinafter described, and referred to in the claims.

In the accompanying drawings, illustrating my invention, Figure 1 is a plan view; Fig. 2, an end view; Fig. 3, a side elevation. Fig. 4 is a section on line $a\,b$ of Fig. 2, and Fig. 5 a detached view of a modification of the cup-supporting frame.

Usually the battery elements rest on the bottom of the cups or jars containing the electrolyte, or hang from the top of the vertical sides thereof, or are otherwise not supported so as to be independent of the jars or their supports. The objections to supporting methods of the general type referred to are principally that it puts too much weight on the jar or cup, that it tends to cause short circuits in the battery, that it requires a handling of the electrodes to remove them from the cups when desired, and also renders it difficult to make repairs to jars and other elements constituting the battery.

In the method of support according to my invention and as illustrated in the drawings the battery elements and the electrolyte-containers are independently supported, so as to facilitate the assembling and taking apart of the different parts of the battery for the purpose of repairs or otherwise.

In a pair of cross-rails, as indicated at A A, Fig. 1, are mounted at intervals (one for each pair of electrodes) a series of transverse connecting-rods $b$, which are shown secured in position by nuts $b'\,b'$, these rods $b$ being covered first by an insulating-sleeve $b^2$ (see Fig. 4) and then upon the same is mounted additional insulation in the form of sections or washers of rubber tubing or other insulating material, (indicated at $c\,c\,c$ in Figs. 1 and 2,) and these insulating-sections $c\,c\,c$ are designed to insulate from each other the electrode-links and other parts supported on the insulated rod $b$, as hereinafter mentioned. Connecting lead-strips $e$ between the positive and negative electrodes in the series of batteries are mounted upon said insulated bars $b$, contiguous to and severally in contact with the supporting-links $d$ of the electrodes. At suitable intervals relatively to the supporting-bars $b$ are secured to the under side of the pair of cross-rails A A nsulating-blocks, such as the wooden block D, centrally recessed to allow the passage therethrough of the electrode-links $d\,d$, these blocks being held in position by the cup-supporting frame E E, the rods of which pass through holes or slots $e^2$, Fig. 3, in the block and are secured to the cross-rails A A by nuts $e'$, this method of uniting them being shown at the left-hand side of Fig. 3, the parts being there illustrated in detached position. The cup-supporting frames E E are in pairs. (See Fig. 2.) The cup H is maintained in position by its base resting on the lower cross-piece $e^3$ in the pair of frames E E. To remove or to replace the jars or cups, it is not necessary to handle the electrodes T nor to disturb or remove them from their supports, but merely to remove the screw-nuts $e'$ holding the frames E E in place, as will be seen on reference to lower left-hand side of Fig. 3. In lieu, however, of removing the entire frame E from its mounting in the cross-pieces A A for the purpose of removing or replacing the cup or jar the lower cross-piece $e^3$ of the frame E may be made separate therefrom and detachably held in place therein by screw-nuts, such as $e'$, Fig. 5, or other like means.

Having thus described my invention, what I claim as new, and desire to secure by Letters Patent, is—

1. Supporting devices operating to independently and removably connect and support the battery elements and their jars or cups, consisting of a cross-frame with a series of insulated bars therein, conducting means between said bars, a pair of electrodes hung on each of said bars, a depending frame detachably supported from the cross-frame and adapted to support the jars; substantially as described.

2. Means for supporting battery elements independently of the supporting means for the electrolyte-containers, said means consisting of a cross-frame, a series of insulated bars held therein, a pair of electrodes dependent from each of said insulated bars, and links for supporting the electrodes, connecting devices between the batteries, with sections of insulating material electrically separating from each other the electrode-links and the connecting devices between the batteries; substantially as described.

3. Means for supporting battery elements and electrolyte-jars, independently of each other, and means for detachably mounting said jars; the same consisting of a cross-frame upon which a series of insulated supporting-bars are mounted, a pair of electrodes dependent from each supporting-bar, connecting conducting devices mounted on said insulated bars; an insulating-block supported in the cross-frame; and a jar-supporting frame dependent from the cross-frame and detachable therefrom; substantially as described.

In testimony whereof I have hereunto affixed my signature this 6th day of April, A. D. 1899.

RODERICK MACRAE.

Witnesses:
WALTER C. PUSEY,
H. T. FENTON.